(12) United States Patent
Morgenstern

(10) Patent No.: US 7,878,716 B2
(45) Date of Patent: Feb. 1, 2011

(54) FERRULE CONNECTOR ASSEMBLY

(75) Inventor: David Morgenstern, Palo Alto, CA (US)

(73) Assignee: Finisar Corporation, Sunnyvale, CA (US)

( * ) Notice: Subject to any disclaimer, the term of this patent is extended or adjusted under 35 U.S.C. 154(b) by 147 days.

(21) Appl. No.: 11/381,105

(22) Filed: May 1, 2006

(65) Prior Publication Data

US 2006/0251359 A1    Nov. 9, 2006

Related U.S. Application Data

(60) Provisional application No. 60/676,427, filed on Apr. 29, 2005.

(51) Int. Cl.
*G02B 6/36* (2006.01)
(52) U.S. Cl. ........................................ 385/78
(58) Field of Classification Search ........................ None
See application file for complete search history.

(56) References Cited

U.S. PATENT DOCUMENTS 6,371,660 B1 * 4/2002 Roehrs et al. .................. 385/59
6,953,290 B2 * 10/2005 Nakanishi et al. ............. 385/93

* cited by examiner

*Primary Examiner*—Uyen-Chau N Le
*Assistant Examiner*—Hoang Tran
(74) *Attorney, Agent, or Firm*—Workman Nydegger

(57) ABSTRACT

A ferrule connector assembly including a housing having a base member and a nose member is disclosed. The base member includes a bore having a first diameter portion that receives the nose member and a second diameter portion. A split sleeve cooperates with the base member and has first and second ends. The split sleeve has an outer diameter that varies based upon forces applied thereto. A fiber stop is disposed within the split sleeve and includes an optical path for light propagating through the assembly. A member mounts within the second diameter portion of the bore and is fixed within the second diameter portion by the nose member. The member mounts to the first end of the split sleeve and fixes the outer diameter of the split sleeve at the first end and allows the outer diameter of the second end to vary based upon forces applied thereto.

16 Claims, 2 Drawing Sheets

FERRULE CONNECTOR ASSEMBLY

CROSS-REFERENCE TO RELATED APPLICATIONS

This application claims the benefit of the U.S. Provisional Patent Application No. 60/676,427, filed Apr. 29, 2005, and entitled "Ferrule Connector Assembly," which is incorporated herein by reference in its entirety.

BACKGROUND OF THE INVENTION

1. The Field of the Invention

The present invention relates to optical connectors. More specifically, the present invention relates to a connector assembly used to hold an optical fiber in precise alignment with respect to an optical subassembly, such as a transmitter optical subassembly or a receiver optical subassembly.

2. The Relevant Technology

Ferrule type optical connectors are well known in the art, and include a receptacle for receiving an optical fiber ferrule. An optical fiber ferrule is a cylindrical member with a central bore through which an optical fiber extends. The ferrule provides a flat, cylindrical, or angle polished mating end surface and a cylindrical side surface, both of which engage corresponding mating surfaces of a ferrule receptacle or connector. The optical fiber terminates at or near the ferrule's flat mating surface.

The ferrule connector typically includes a cylindrical cavity for receiving and mating with the ferrule. The ferrule connector includes a hollow bore that is centered to the optical fiber, even after repeated re-connections, to maximize optical coupling efficiency. In order to ensure precise alignment, ferrule connectors typically include many parts that have to be optically aligned. The parts are assembled, aligned, and then generally secured with welds or adhesives to maximize the transmission of light signals through the connector.

Unfortunately, such connectors are cumbersome and expensive to manufacture. They also generally require an active alignment process that is also both time consuming and expensive, especially with the need to secure parts of the connector using welds or adhesives.

BRIEF SUMMARY OF THE INVENTION

The present invention is a ferrule connector assembly that overcomes the disadvantages outlined above. In one embodiment a ferrule connector assembly includes a housing having a base member and a nose member. The base member can include a bore having a first diameter portion and a second diameter portion, the nose member being selectively received within the first diameter portion. A split sleeve cooperates with the base member and has a first end and a second end. The split sleeve has an outer diameter that varies based upon forces applied to the split sleeve. A fiber stop is at least partially disposed within the split sleeve and includes an optical path for light propagating through the ferrule connector assembly. A member mounts within the second diameter portion of the bore and is fixed within the second diameter portion by the nose member. The member mounts to the first end of the split sleeve and fixes the outer diameter of the split sleeve at the first end and allows the outer diameter of the second end to vary based upon the force applied to the split sleeve.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE EMBODIMENTS

The present invention is a ferrule connector assembly that holds an optical fiber in precise alignment with respect to an optical subassembly, such as a transmitter or receiver, to which the connector assembly attaches. The ferrule connector also securely holds the optical fiber while permitting a portion of the optical fiber to flex during use.

Figure 1:
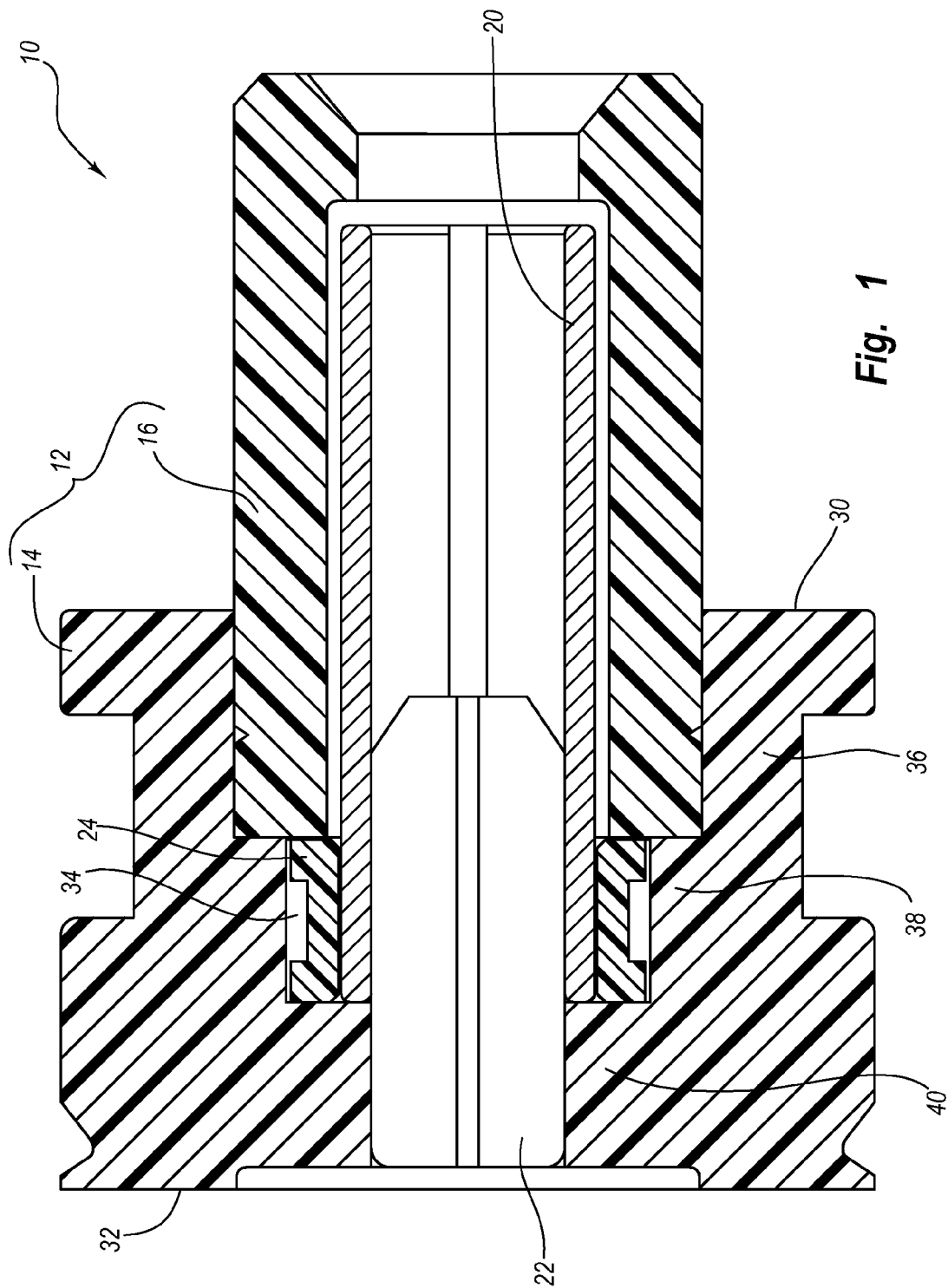
FIG. 1 is a cross-sectional side view of a ferrule connector assembly according to one exemplary embodiment of the present invention.

With reference to FIG. 1, a ferrule connector assembly 10 according to one aspect of the present invention is disclosed. Ferrule connector assembly 10 can include a housing 12 having a base member 14 and a nose member 16. Disposed with the housing 12 are (i) a split sleeve 20 that can receive a portion of an optical fiber (not shown), (ii) a fiber stop 22 that prevents excessive insertion of the optical fiber into the housing 12, and (iii) a stiffening member 24 that limits the expansion of the split sleeve 20 upon inserting the optical fiber within the split sleeve 20. These components securely hold the optical fiber at the fiber-fiber stop interface and allow limited movement of the remainder of the optical fiber.

Base member 14 has a first end 30 and a second end 32. Extending from first end 30 to second end 32 is a bore 34. The bore 34 has a stepped configuration so that the bore 34 includes a number of different internal diameters. As illustrated, the bore 34 extends from a first portion 36 having a first internal diameter, to a second portion 38, having a second internal diameter, and finally to a third portion 40 having a third internal diameter. The first portion 36 receives a nose member 16, while the second portion 28 receives the stiffening member 24 and the third portion 40 receives the fiber stop 22 as it passes into the split sleeve 20 mounted to the stiffening member 24.

Discussion will now be made to each of the individual components and the particular structure and function of each component. Turning first to the nose member 16, and with reference to FIG. 2, the nose member 16 has a first end 50 and a second end 52. The first end 50 includes an outer tapered portion 62 to aid with attaching or connecting the ferrule connector assembly 10 to other optical components.

A bore 54 extends from the first end 50 to the second end 52 and includes a generally tapered portion 56 at the first end 50 that transitions to an intermediate portion 58. The intermediate portion 58 also transitions to a bore portion 60 having a diameter greater than intermediate portion 58. As is known to those skilled in the art, the tapered portion 56 aides with insertion of a ferrule 44, illustrated in dotted lines in FIG. 2, that is associated with a variety of different connectors. In other configurations of the first end 50 need not include the tapered portion 56.

With the configuration of the nose member 16, forces applied to the ferrule connector assembly 10 are transmitted through the nose member 16 and to the base member 14 without adversely affecting the split sleeve 20. In addition, since the diameter of bore portion 60 is greater than that of the intermediate portion 58, the split sleeve 20 can move within the bore portion 60 during insertion of the ferrule 44 and optionally during use of the ferrule connector assembly 10. This allows the split sleeve 20 to accommodate optical fibers of differing diameters and also limits potential damage to the optical fiber disposed within the split sleeve 20 during use. Less damage to the optical fiber and associated degradation of signal propagation along the optical fiber then occurs.

Generally, the nose member 16 can be a machined metal part having the above-described configuration. Illustrated metals can include, but not limited to, stainless steel, nickel plated brass or aluminum. Alternatively, the nose member 16 can be ceramic, plastic, or other material having sufficient strength to support the other components of the ferrule connector assembly 10. The nose member 16 can be machined on a screw machine or lathe or use appropriate equipment known those skilled in the art. Since, as illustrated, the nose member is radial symmetrical, it can be fabricated in single step on a single machine, thus making it very easy to mass produce.

Figure 2:
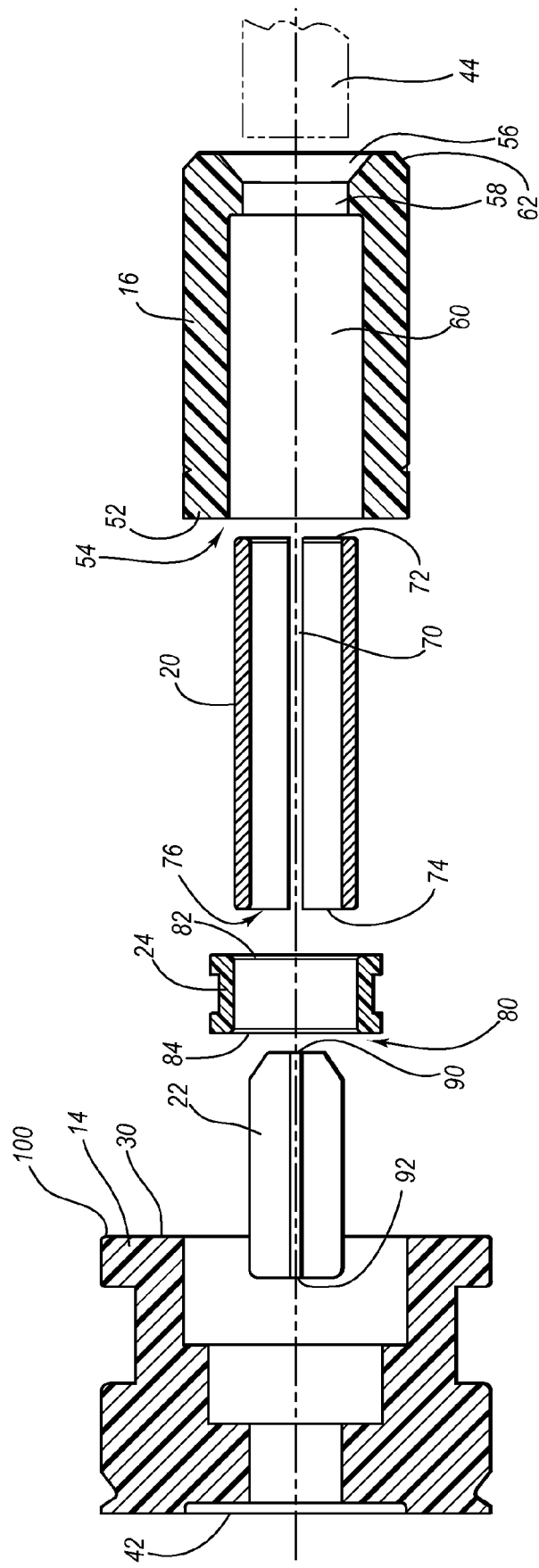
FIG. 2 is a cross-sectional exploded side view of the ferrule connector assembly of FIG. 1, according to one exemplary embodiment of the present invention.

With continued reference FIG. 2, the split sleeve 20 cooperates with a stiffening member 24 and is received within the nose member 16. The split sleeve 20 is a generally tubular member with a channel 70 extending from a first end 72 to a second end 74. The channel 70 cooperates with a sleeve lumen 76 to enable an outer diameter and an inner diameter of the split sleeve 20 to change based upon the forces applied to the split sleeve 20, such as when the ferrule 44 is disposed within the channel 70. For instance, forces applied against an outer surface of the split sleeve 20 toward a central axis of the split sleeve 20 cause a decrease in the size of the channel 70, with a resultant decrease in the outer diameter of the split sleeve 20 and a decrease in the diameter of the sleeve lumen 76. Similarly, forces applied against an inner surface of the split 20 away from a central axis of the split sleeve 20, such as when the fiber stop 22 or the ferrule 44 is disposed within the sleeve lumen 76, increases the size of the channel 70, with a resultant increase in the outer diameter of the split sleeve 20 and the diameter of the sleeve lumen 76.

The inner diameter of the split sleeve 20, i.e., the diameter of the sleeve lumen 76, can approximate the inner diameter of the intermediate portion 58 of the nose member 16. By so doing, a portion of the split sleeve 20 can receive a portion of the ferrule 44 that passes through the first end 50 of the nose member 16 and into the split sleeve 20. Since the split sleeve 20 can expand under the influence of forces applied against an inner surface of the split 20 away from a central axis of the split sleeve 20, the split sleeve 20 aids in securing ferrules and optical fibers of different diameters within the connector assembly 10. In other configurations, the inner diameter of the split sleeve 20 can be greater or lesser than the diameter of the intermediate portion 58.

Generally, the split sleeve 20 can fabricated from various materials, so long as the material allows the split sleeve 20 to resiliently flex during application of a force that closes or opens the channel 70. For instance, the split sleeve 20 can be fabricated from metals, ceramics, plastics, polymers, synthetic materials, composites, or other suitable materials.

Turning to the stiffening member 24, the stiffening member 24 can include a lumen 80 having a first tapered portion 82 and a second tapered portion 84. The lumen 80 can receive the split sleeve 20 and the fiber stop 22. The configuration of the ferrule connector assembly 10 results in the split sleeve 20 being mounted to the stiffening member 24 within one end supported and one end unsupported. Stated another way, at least one of the stiffening member 24 and the base member 14 support the split sleeve 20 so that one end of the split sleeve 20 is moveable relative to other end because of the support of at least one of the stiffening member 20 and the base member 14. The split sleeve 20 aids with fixing the position of the split sleeve 20 within the ferrule connector assembly 10 so that one end is movable relative to the other end.

The stiffening member 24 has a generally C-shaped cross-section and is sized for disposal within the second portion 38 of the base member 14, as shown in FIG. 1. Although the C-shape cross-section is one configuration, it will be understood that other cross-sectional configurations are also possible and may be selected based upon the particular needs of the application.

Generally, the stiffening member 24 can be a machined metal part having the lumen 80 therethrough. Illustrative metals can include, but not limited to, stainless steel, nickel plated brass or aluminum. Alternatively, the stiffening member 24 can be a ceramic material, a plastic material, a composite material, or other material having the desired properties to function as described herein.

As mentioned above, mountable within the split sleeve 20 is the fiber stop 22 that is generally fabricated from zirconium or other materials having the desired strength and optical properties. The fiber stop 22 has a tapered end 90 to aid in locating within the split sleeve 20 and through the base member 14. The fiber stop 22 limits longitudinal displacement of the ferrule 44 with the associated optical fiber, within the channel 70 of the split sleeve 20. The fiber stop 22 also provides an optical path for the light to propagate from the optical fiber and to an optical subassembly to which the ferrule connector assembly 10 can connect. With the particular illustrated configuration, since the fiber stop 22 is press fit into both the base member 14 and the split sleeve 20, the location of the fiber stop 22 can be varied to adjust for power losses between the optical fiber and the optical device to which the ferrule connector assembly 10 mounts. For instance, the complete optical subassembly, including a ferrule connector assembly, can be tested to verify that the desired laser power level is attained. In the event that the complete optical subassembly, including the ferrule connector assembly, outputs a power level different from the desired, optionally a new ferrule connector assembly having a fiber stop of different length and/or at a different location within the base member 14 can be substituted to attain the desired power output. In this manner, different lengths of fiber stop 22 can be used to vary the power output of the laser (not shown). Alternatively, the fiber stop can be either removed or the location within the base member 14 varied to obtain the desired laser optical power level. Note that, because a portion of the fiber stop 22 is firmly held in place by a corresponding portion of the base member 14, the fiber stop is desirably less apt to slip out of place.

With continued reference to FIG. 2, the base member 14 includes one or more attaching structures 100 at the first end 30. These attaching structures 100 aid with the affixing the ferrule connector assembly 10 to other optical assemblies, subassemblies, or other portions of the optical network. Attaching structures 100 aid with affixing, whether or temporarily or permanently, ferrule connector assembly 10 to a transmitter optical subassembly, receiver optical subassembly, or any other optical component or structure that use a ferrule-type connector. The attaching structures 100 can includes fins, threads, or other structures known to those skilled in the art. Disposed at the second end 32 is also a recessed portion 42 that can aid with attaching the base member to any of the above identified structures or assemblies.

As with the nose member 16, the base member 14 can be a machine part having the identified bore 34 therethrough. Illustrative metals can include, but not limited to, stainless steel, nickel plated brass or aluminum. Alternatively, the base member 14 can be a ceramic, plastic, other material having sufficient strength to support the other components of the ferrule connector assembly 10. The base member 14 can be machined on a screw machine or lathe or other appropriate equipment known those skilled in the art. Since, as illustrated, the base member 14 is radial symmetrical, it can be fabricated in a single step on a single machine, thus making it very easy to mass produce.

The configuration of the ferrule connector assembly 10 lends itself to simple and efficient manufacturing processes. For instance, in one configuration, the ferrule connector assembly 10 can be fabricated by press fitting the fiber stop 22 into base member 14. Following mounting of the fiber stop 22, the split sleeve 20 can mount to the fiber stop 22 and the stiffening member 24 can be at least partially secured about the split sleeve 20. Once the stiffening member 24 at last partially engages with the second portion 38 of the bore 34, the nose member 16 can be mounted to the first portion 36. As the nose member 16 mounts to the first portion 36, the second end 52 of the nose member 36 can force the stiffening member 24 into further engagement with the second portion 38. Due to the press fit between the nose member 16 and the base member 14, and optionally the press fit between the stiffening member 24 and the base member 14, the stiffening member 24 is maintained within the second portion 38 of the base member 14.

Note that mounting the fiber stop 22 into the base member 14 before insertion of the split sleeve 20 can help to reduce or prevent scratching and/or weakening of the split sleeve. This in turn reduces the incidence of cracking and failure of the split sleeve 20 during in-field use.

It will be understood that various other manufacturing steps or processes can be used to fabricate the ferrule connector assembly 10. For instance, and not by way of limitation, the stiffening member 24 can completely engage with the second portion 38 prior to mounting of the nose member 16 to the base member 14. In still another configuration, the fiber stop 22 can mount to the base member 14 and engage with the split sleeve 20 after the split sleeve 20 mounts within the base member 14 and is received by the stiffening member 24.

The ferrule connector assembly 10 of the present invention has many advantages. First, it is comprised of relatively few parts that are relative inexpensive and simple to manufacture. Second, the finished assembly is held together through press fits or interference fits. There are no adhesives required in the assembly, which leads to a quicker, higher yielding assembly process. Third, due to the absence of adhesives, welds, or other secondary methods of fixing the assembly, the ferrule connector assembly of the present invention is more robust and reliable in operation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A ferrule connector assembly comprising:
    a split sleeve having a first end and a second end, said first end selectively receives a fiber stop having a longitudinal hole therethrough;
    a stiffening member mounted to said first end of said split sleeve; and
    a base member comprising a bore having a first diameter portion, a second diameter portion, and a third diameter portion, a portion of a nose member being receivable within said first diameter portion, said stiffening member that receives said first end of said split sleeve being mountable within said second diameter portion, and at least a portion of said fiber stop being receivable within said third diameter portion,
    wherein each of the first, second, and third diameter portion of the base member bore has a mutually diameter whose endpoints are at a boundary between the base member and the base member bore.

2. The ferrule connector assembly of claim 1, wherein said fiber stop extends from said third diameter portion into said first end of said split sleeve.

3. The ferrule connector assembly of claim 2, wherein said stiffening member fixes an outer diameter of said split sleeve at said first end and allows said outer diameter of said second end to vary based upon a force applied to said split sleeve by an optical fiber selectively received by said nose member.

4. The ferrule connector assembly of claim 1, wherein said split sleeve mounts to said stiffening member with one end supported and one end unsupported.

5. The ferrule connector assembly of claim 1, wherein said split sleeve mounts to said base member with one end supported and one end unsupported.

6. The ferrule connector assembly of claim 1, wherein said fiber stop is movable relative to said base member to adjust for power losses in transmission of light through said fiber stop.

7. The ferrule connector assembly of claim 1 wherein said base member further comprises an attachment structure.

8. The ferrule connector assembly of claim 1, wherein said base member is radially symmetrical.

9. A ferrule connector assembly comprising:
    a housing having a base member and a nose member, said base member including a bore having a first diameter portion and a second diameter portion, said nose member being selectively received within said first diameter portion;
    a split sleeve having a first end and a second end, said split sleeve having an outer diameter that varies based upon forces applied to said split sleeve;
    a fiber stop at least partially disposed within said split sleeve; and
    a stiffening member mountable within said second diameter portion of said bore and fixed within said second diameter portion by said nose member, said member mountable to said first end of said split sleeve and fixes said outer diameter of said split sleeve at said first end and allows said outer diameter of said second end to vary based upon said force applied to said split sleeve,
    wherein each of the first and second diameter portions of the base member bore has a mutually distinct diameter whose endpoints are at a boundary between the base member and the base member bore.

10. The ferrule connector assembly of claim 9, wherein said bore further comprises a third diameter portion, said fiber stop being receivable within said third diameter portion.

11. The ferrule connector assembly of claim 9, wherein at least one of said stiffening member and said base member support said split sleeve and a first end of said split sleeve is moveable relative to a second end of said split sleeve by the support of at least one of said stiffening member and said base member.

12. The ferrule connector assembly of claim 9, wherein said fiber stop is movable relative to said housing to adjust for power losses in transmission of light from the optical fiber through said fiber stop.

13. The ferrule connector assembly of claim 9 wherein said housing further comprises an attachment structure disposed at said first end.

14. The ferrule connector assembly of claim 9, wherein the stiffening member has a c-shaped cross-section.

15. The ferrule connector assembly of claim 1, wherein said third diameter portion of said base member bore is narrower than a diameter of said split sleeve.

16. The ferrule connector assembly of claim 1, wherein said second diameter portion of said base member bore is located between said first diameter portion and said third diameter.

* * * * *